(12) United States Patent
Sitaraman et al.

(10) Patent No.: US 7,606,246 B2
(45) Date of Patent: *Oct. 20, 2009

(54) PROXY ON DEMAND

(75) Inventors: Aravind Sitaraman, Santa Clara, CA (US); Craig Michael Alesso, Lake Elmo, MN (US); Charles Troper Yager, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 557 days.

This patent is subject to a terminal disclaimer.

(21) Appl. No.: 11/402,301

(22) Filed: Apr. 10, 2006

(65) Prior Publication Data

US 2006/0253896 A1    Nov. 9, 2006

Related U.S. Application Data

(63) Continuation of application No. 10/165,573, filed on Jun. 7, 2002, now Pat. No. 7,246,154, which is a continuation of application No. 09/306,528, filed on May 6, 1999, now Pat. No. 6,466,977.

(51) Int. Cl.
    *H04L 12/56* (2006.01)
(52) U.S. Cl. .................. 370/401; 370/252; 709/223
(58) Field of Classification Search .................. 370/229, 370/230, 252, 253, 354, 401, 427, 465, 466, 370/493, 310; 709/223–226, 217, 105, 238, 709/239, 229; 726/6; 712/27
See application file for complete search history.

(56) References Cited

U.S. PATENT DOCUMENTS

| | | | |
|---|---|---|---|
| 4,763,191 A | 8/1988 | Gordon et al. | 358/86 |
| 4,922,486 A | 5/1990 | Lidinsky et al. | 370/60 |
| 4,962,497 A | 10/1990 | Ferenc et al. | 370/60.1 |
| 5,003,595 A | 3/1991 | Collins et al. | 380/25 |
| 5,241,594 A | 8/1993 | Kung | 380/4 |

(Continued)

FOREIGN PATENT DOCUMENTS

EP    0 567 217    10/1993

(Continued)

OTHER PUBLICATIONS

Active Software's Integration System, Active Software, Inc., Retrieved from the Internet: <URL: http://www.activesw.com/products/products.htm>, Jul. 24, 1998, 6 pages.

(Continued)

*Primary Examiner*—Ricky Ngo
*Assistant Examiner*—Gary Mui
(74) *Attorney, Agent, or Firm*—Patent Capital Group

(57) ABSTRACT

In a first aspect of the present invention, a Wholesaler dynamically identifies one of a plurality of AAA services at a remote domain to route an access request to. The AAA service is selected based upon a set of rules applied to information which has been received dynamically from the plurality of AAA services and is indicative of load and status of the plurality of AAA services. In a second aspect of the present invention, a Wholesaler, based upon a Service Level Agreement (SLA) between the Wholesaler and a user, routes the user to one of a plurality of sub-service providers.

34 Claims, 4 Drawing Sheets

U.S. PATENT DOCUMENTS

| | | | | |
|---|---|---|---|---|
| 5,241,599 | A | 8/1993 | Bellovin et al. | 380/21 |
| 5,351,136 | A | 9/1994 | Wu et al. | 358/440 |
| 5,416,842 | A | 5/1995 | Aziz | 380/30 |
| 5,423,002 | A | 6/1995 | Hart | 395/200 |
| 5,440,635 | A | 8/1995 | Bellovin et al. | 380/25 |
| 5,655,077 | A | 8/1997 | Jones et al. | 395/187.01 |
| 5,671,354 | A | 9/1997 | Ito et al. | 395/187.01 |
| 5,684,950 | A | 11/1997 | Dare et al. | 395/187.01 |
| 5,764,756 | A | 6/1998 | Onweller | 379/242 |
| 5,774,660 | A | 6/1998 | Brensel et al. | 709/201 |
| 5,815,665 | A | 9/1998 | Teper et al. | 395/200.59 |
| 5,835,727 | A | 11/1998 | Wong et al. | 395/200.68 |
| 5,838,683 | A | 11/1998 | Corley et al. | 370/408 |
| 5,845,070 | A | 12/1998 | Ikudome | 395/187.01 |
| 5,898,780 | A | 4/1999 | Liu et al. | 380/25 |
| 5,944,824 | A | 8/1999 | He | 713/201 |
| 5,987,232 | A | 11/1999 | Tabuki | 395/187.01 |
| 5,991,810 | A | 11/1999 | Shapiro et al. | 709/229 |
| 5,991,828 | A | 11/1999 | Horie et al. | 710/8 |
| 6,006,264 | A | 12/1999 | Colby et al. | 709/226 |
| 6,006,334 | A | 12/1999 | Nguyen et al. | 713/202 |
| 6,009,103 | A | 12/1999 | Woundy | 370/401 |
| 6,011,910 | A | 1/2000 | Chau et al. | 395/200.59 |
| 6,021,496 | A | 2/2000 | Dutcher et al. | 713/202 |
| 6,026,441 | A | 2/2000 | Ronen | 709/227 |
| 6,047,376 | A | 4/2000 | Hosoe | 713/201 |
| 6,091,951 | A | 7/2000 | Sturniolo et al. | 455/432 |
| 6,092,178 | A | 7/2000 | Jindal et al. | 712/27 |
| 6,092,196 | A | 7/2000 | Reiche | 713/200 |
| 6,108,703 | A | 8/2000 | Leighton et al. | 709/226 |
| 6,119,160 | A | 9/2000 | Zhang et al. | 709/224 |
| 6,141,687 | A | 10/2000 | Blair | 709/225 |
| 6,141,759 | A | 10/2000 | Braddy | 713/201 |
| 6,154,839 | A | 11/2000 | Arrow et al. | 713/154 |
| 6,167,438 | A | 12/2000 | Yates et al. | 709/216 |
| 6,212,640 | B1 | 4/2001 | Abdelnur et al. | 713/201 |
| 6,249,801 | B1 | 6/2001 | Zisapel et al. | 709/105 |
| 6,856,676 | B1 * | 2/2005 | Pirot et al. | 379/201.01 |

FOREIGN PATENT DOCUMENTS

| | | |
|---|---|---|
| WO | 99/53408 | 10/1999 |

OTHER PUBLICATIONS

Ascend Access Control, Product Information, Ascend Communications, Inc., 1997. Retrieved from the Internet: URL: http://www.ascend.com, 1997, 4 pages.

Ascend-Remote Access Network Security, Ascend Communications, Inc., Retrieved from the Internet: URL: http://www.ascend.com/1103.html>, Jul 24, 1998, 8 pages.

Ascend—White Paper, "Multi VPN from Ascend Communications: Breaking Down the Barriers to VPNs", Ascend Communications, Inc., 1998, 14 pages.

Bellovin, Steven M., "Problem Areas for the IP Security Protocols," Proceedings of the Sixth Usenix UNIX Security Symposium, San Jose, CA, Jul. 22-25, 1996, 10 pages.

Bracho, Dr. Rafael, "Intergrating the Corporate Computing Environment with Active Software," Active Software, Inc., Retrieved from the Internet: <URL: http://www.activesw.com/tech/7service.htm#doctop>, Nov. 18, 1998, 17 pages.

Bracho, Dr. Rafael, "Mastering Corporate Computing with the Active Web™ System," Active Software, Inc., Aug. 2, 1996, 16 pages.

Carrel, D. et al., "The TACACS+ Protocol, Version 1.78," Cisco Systems, Inc., Jan. 1997, 40 pages.

IBM News, "IBM Introduces New Subscriber Management System for Internet Service Providers," IBM Corporation. Retrieved from the Internet: <URL: http://www.ibm.com/News/1997/12/Is9712102.html>, Dec. 2, 1998, 1 page.

Livingston et al., "Remote Authentication Dial In User Service (RADIUS)," Network Working Group. Retrieved from the Internet: <URL: ftp://ds.internic.net/rfc/rfc2138>, Apr. 1997, 57 pages.

* cited by examiner

| DOMAIN | IP ADDRESS | SHARED SECRET | PORT NUMBER |
|---|---|---|---|
| CORP$_A$ | 1.2.3.4 | PASSWORD 1 | 300 |
| CORP$_B$ | 1.2.3.5 | PASSWORD 2 | 400 |
| ⋮ | ⋮ | ⋮ | ⋮ |

FIG. 3

| DOMAIN | IP ADDRESS | SHARED SECRET | PORT NUMBER | STATUS | LOAD FACTOR |
|---|---|---|---|---|---|
| CORP$_A$ | 1.2.3.4 | PASSWORD 1 | 300 | 1 | 50 T/sec |
|  | 1.2.3.5 | PASSWORD 2 | 300 | 1 | 100 T/sec |
|  | 1.2.3.6 | PASSWORD 3 | 300 | 1 | 200 T/sec |
| CORP$_B$ | ⋮ | ⋮ | ⋮ | ⋮ | ⋮ |
| ⋮ |  |  |  |  |  |

FIG. 4

PROXY ON DEMAND

CROSS REFERENCE TO RELATED APPLICATION

This application claims priority based on parent application Ser. No. 10/165,573, filed on Jun. 7, 2002, which is also a continuation of application Ser. No. 09/306,528 filed on May 6, 1999, now U.S. Pat. No. 6,466,977, issued on Oct. 15, 2002, and entitled "Proxy on Demand" in the name of the same inventors and commonly owned herewith.

BACKGROUND OF THE INVENTION

1. Field of the Invention

The present invention relates to the field of data communications networks. More particularly, this invention relates to a method and apparatus for providing proxied authentication, authorization and accounting on demand in a data communications network.

2. The Background

ISPs (Internet Service Providers) and Telcos (telephone companies) (collectively referred to as "Wholesale Providers" or "Wholesalers") typically offer wholesale Internet access and retail Internet access to their subscribers. Wholesale access is typically offered to subsidiary and specialized service providers, CLECs (Competitive Local Exchange Carriers), corporations, and Community of Interest (COI) providers. Naturally, the processing afforded customers of the wholesale variety differs from the processing afforded customers of the retail variety. Subscriber information for individual wholesale users is usually stored by those who lease data communications network access from the Wholesaler. Hence, corporations, CLECs and COI providers do not normally share their user information with the wholesale providers. The Wholesaler, however, typically also has its own retail subscribers whose user information is stored in its databases. In some cases, a particular user might have accounts with both a retail and wholesale provider. Hence, the Wholesaler must distinguish between the user's wholesale and retail accounts and initiate different actions based upon their status or Service Level Agreements (SLAs).

See, for example, FIG. 1 where a pure retail environment has a number of network access servers ($NAS_1$, $NAS_2$ and $NAS_3$) which provide data communications portals to the Wholesaler's point of presence (PoP) on the data communications network Each NAS is in communication with a conventional AAA (authentication, authorization and accounting) service maintained by the Wholesaler. Incoming users connect to the NASes by dialing in over the telephone network or in another conventional manner such as via DSL (digital subscriber line) access, cable, ISDN (integrated services digital network, etc.).

Traditional wholesale ISPs and Roaming Service Providers offer network access through a technique called "authentication proxying." Proxying involves the transfer of the authentication responsibility-to the "owner" of the subscriber. Thus, if a corporation was to outsource its corporate intranet to a Wholesaler, it would give up the maintenance of its dial-up servers (i.e., the NASes). It would not, however, normally want to give up the control of or information regarding its employees. Hence, when a corporate user connects to such a Wholesaler's network access servers, the user essentially perceives that the user is dialing into a corporate facility when the user is actually dialing into the Wholesaler's domain and then somehow gaining admittance to the corporation's intranet.

What really happens in that scenario is that the Wholesaler determines that the user belongs to Corporation A ($Corp_A$) by parsing either the fully qualified domain name ("FQDN") (e.g., Joe@corpa.com) supplied by the user, reading the DNIS ID associated with the call, reading the CLID associated with the call, or by using some other known mechanism. Using a DNIS ID, the Wholesaler looks at the telephone number (or a specific NAS in access networks other than dial-up) through which the user is connecting to the network. The DNIS ID is the telephone number of the completing station. So if a user calls in to 123-456-7890 from his number of 123-444-5555, then the Wholesaler can know which number was called, i.e., the completing station. Having determined that the user trying to gain access belongs to $Corp_A$, the Wholesaler cannot authenticate the user by itself. As noted earlier, the user's record is still located on $Corp_A$'s equipment. Hence, the Wholesaler will "proxy" out the authentication transaction from its AAA proxy service to $Corp_A$. An AAA service within the corporation domain then identifies the user, verifies the password, and provisions the user with appropriate authorizations. It may also receive accounting information, if desired then the AAA service at $Corp_A$ notifies the Wholesaler's proxy service that the user is acceptable and passes along provisioning details associated with the user (such as an IP (Internet protocol) address to use or a pool identification of an IP address pool from which an IP address needs to be allocated and any other information that may be needed). The Wholesaler then grants the user access to the network based upon the reply it gets back from $Corp_A$. This technique is called "proxying." This is shown diagrammatically in FIG. 2.

To be able to perform basic proxying, the Wholesaler maintains minimal information on its proxy service 14 at its PoP. Information such as supported domain names, the IP address to which the transaction is to be sent, the port number (typically an OSI Layer 4 port number) to which the transaction is to be addressed, a shared secret between the proxy service and the remote AAA service, etc., are stored much as illustrated in FIG. 3.

For example, turning now to FIG. 2, user Joe@corpa.com dials in to $NAS_1$. A PPP (point to point protocol) session 10 is typically raised between Joe's terminal and $NAS_1$. An LCP (Link Control Protocol) session 12 is raised between $NAS_1$, and Joe's terminal. At this time the $NAS_1$ generates an AAA authentication request using a protocol such as RADIUS (Remote Authentication Dial-In User Service) to the Wholesaler's proxy service 14. Proxy service 14 then consults its local configuration database 16 which contains information like that outlined in FIG. 3. Proxy service 14 then makes a determination about where to send the authentication request (Access-Request in RADIUS) packet. At this time, the proxy service decides to forward the authentication request to the AAA service 18 maintained in the $Corp_A$ domain 20. The $COrp_A$ AAA 18 then consults its local database 22 and authenticates Joe@corpa.com. $Corp_A$ AAA 18 then returns an access-accept packet to proxy service 14 which, in turn, sends an access-accept packet to $NAS_1$. Then an IPCP (Internet Protocol Control Protocol) session is raised between $NAS_1$ and Joe's terminal during which an IP address is returned to configure Joe's terminal's PPP stack completing the log-in of Joe@corpa.com.

Turning now in more detail to FIG. 3 the proxy service's database includes a table containing for each entry a domain to be proxied to, i.e., the domain of $Corp_A$, $Corp_B$, etc. Associated with each domain entry is a single AAA IP address that identifies the IP address of the AAA service to use at the specified domain. Associated with each AAA IP address is an IP Layer 4 port number (or some other indicator) identifying the port number on which the domain's AAA service is listening to authentication (such as the RADIUS protocol) requests. Finally, for each entry a shared secret is stored which is used to hash (encode and decode) the packets being sent to the domain's AAA service.

This approach has a number of drawbacks. First, the Wholesaler is unable to load balance among a number of instances of an AAA service at the domain. This is in part because it only knows of one AAA at the domain. Second, the Wholesaler is unable to detect or respond to problems at the domain's AAA service. Third, if the domain's AAA service becomes unavailable, no one entering the Wholesaler and requiring the use of that domain can log-in because of the authentication and authorization service outage. Fourth, if the domain's AAA service becomes over-used and too busy, users cannot log-in with the Wholesaler or may experience delays. Furthermore, this approach offers no practical mechanism whereby a Wholesaler can switch service components for a retail user owned by a Wholesaler based upon the Wholesaler's Service Level Agreement (SLA) with the user.

Accordingly, it would be desirable to permit a proxying ISP to load balance among multiple instances of AAA services at a remote domain. It would also be desirable to identify problems with such AAA services as well as to empower a Wholesaler to route a user to an appropriate sub-service provider based upon the SLA. Furthermore, it would-be desirable for the Wholesaler to dynamically decide, based upon heuristics, the AAA service to use. The heuristics may be based upon SLA parameters such as tie of day, day of week, quality of service level, subscribed and available network bandwidth, etc. Alternatively, in the case of subscribers owned by the Wholesaler, it may also be based upon agreements between the Wholesaler and one or more retailers. This is even more important when retailers start advertising rates dynamically to Wholesalers to attract traffic on their networks.

SUMMARY OF THE INVENTION

In a first aspect of the present invention, a Wholesaler dynamically identifies one of a plurality of AAA services at a remote domain to route an access request to. The AAA service is selected based upon a set of rules applied to information which has been received dynamically from the plurality of AAA services and is indicative of load and status of the plurality of AAA services. In a second aspect of the present invention, a Wholesaler, based upon a Service Level Agreement (SLA) between the Wholesaler and a user, routes the user to one of a plurality of sub-service providers.

BRIEF DESCRIPTION OF THE DRAWINGS

FIG. 3 is a diagram illustrating the information maintained by a conventional proxy service.

FIG. 4 is a diagram illustrating the information maintained by a proxy service in accordance with a presently preferred embodiment of the present invention.

DETAILED DESCRIPTION OF THE PREFERRED EMBODIMENTS

Figure 1:
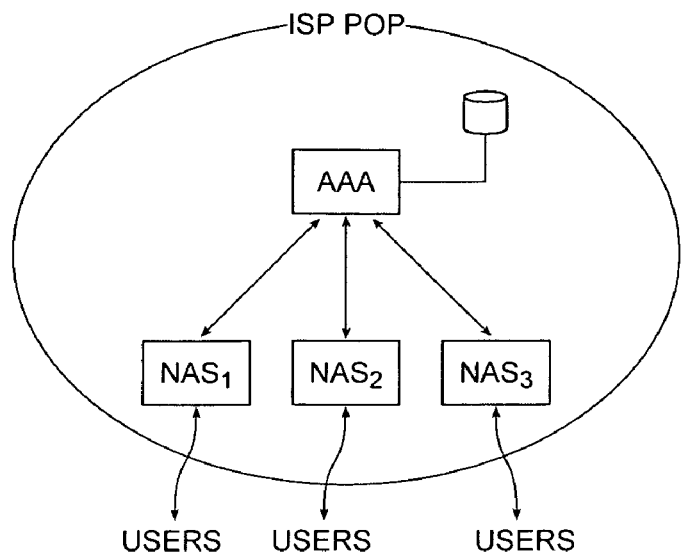
FIG. 1 is a system block diagram of a simple ISP PoP using a conventional retail-only paradigm.
Figure 2:
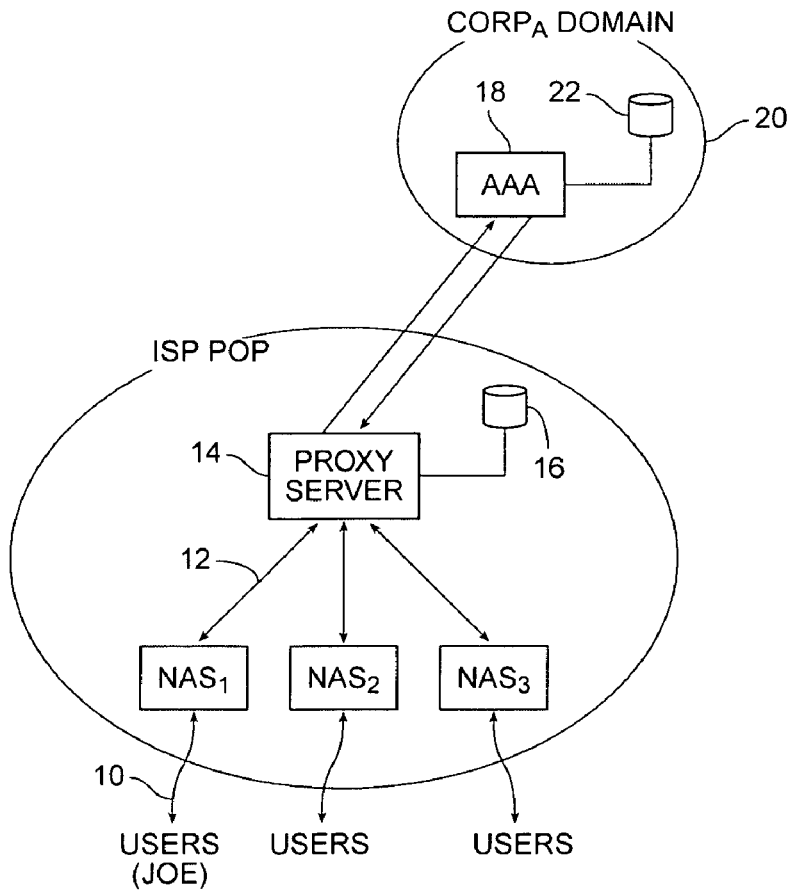
FIG. 2 is a system block diagram of wholesale ISP PoP using a conventional wholesale-only paradigm.

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, processes and/or data structures may be implemented using C++ programs running on high-performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

In accordance with one embodiment of the present invention the AAA proxy service may be implemented within a protocol gateway (PGW). PGWs are devices which couple users via a network access server (NAS) to the data communications network by dynamically converting protocols. The term gateway is not meant to be limited to a single type of device, as any device, hardware or software, that may act as a bridge between the user and the network may be considered a gateway for the purposes of this application. In accordance with one presently preferred embodiment of the present invention, the PGW may be a software service operating on a general purpose computer running the User Control Point (UCP) software package available from Cisco Systems, Inc. of San Jose, Calif.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with a presently preferred embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the data communications network and still be within the inventive concepts disclosed herein.

As pointed out above, traditional proxy service implementation merely reads address information of an AAA service at a remote domain from a table maintained at the local proxy AAA service of the ISP and routes the AAA request based upon the single address looked up. The present invention enables the ISP to dynamically identify one of a plurality of AAA services maintained by the remote domain and routes the AAA request to that identified AAA service.

Figure 5:
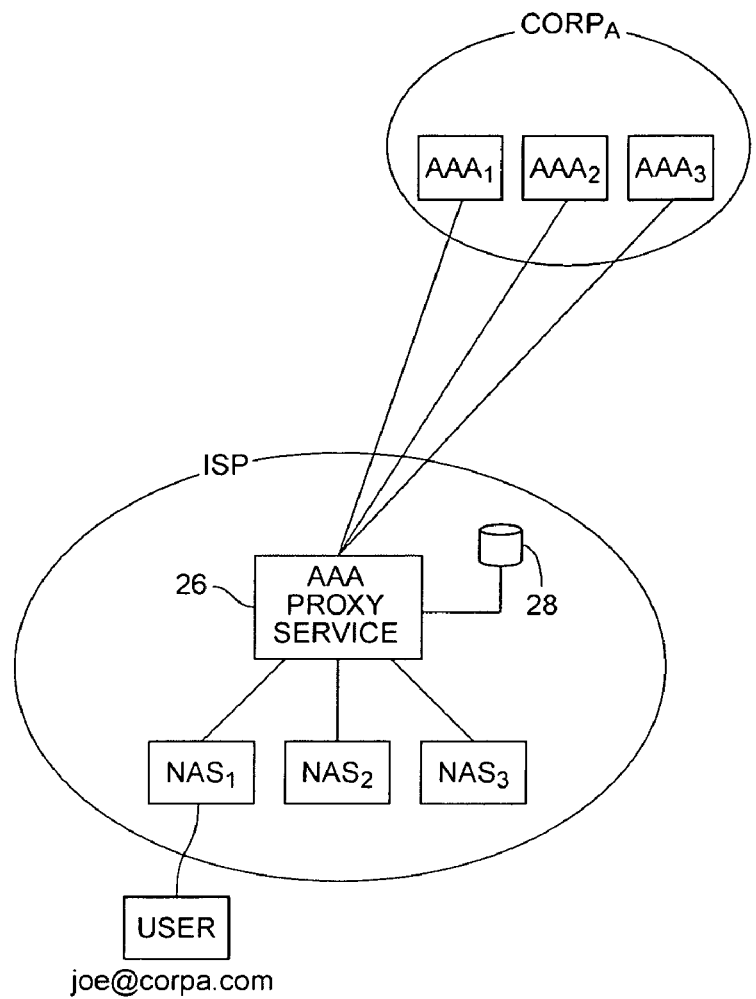
FIG. 5 is a diagram illustrating a system for accessing one of a plurality of remote AAA services at a domain in accordance with a presently preferred embodiment of the present invention.

Turning now to FIG. 5, consider a user who is an employee of Corporation A ($Corp_A$). His user name is Joe@corpa.com. He also happens to subscribe to voice over P (VOIP) services with the ISP and hence receives an account with the user name Joe@ISP.net. When the user dials into the ISP as Joe@corpa.com the ISP parses the FQDN to determine that Joe's domain is corpa.com. The ISP's AAA proxy service maintains a database preferably much like the one shown in FIG. 4. This database includes the domain name, a plurality of IP addresses for AAA services at the domain, some sort of shared secret corresponding to each AAA service, port numbers corresponding to each AAA service which identify the port (Layer 4) on which the service is listening to RADIUS requests, and status and load factor information corresponding to each AAA service.

The status information can be as simple as a bit which if turned on indicates that the AAA proxy service is operational and if turned off indicates that it is not operational. More complex status information may also be maintained as will now be clear to those of ordinary skill in the art.

The load factor information may also be of a number of types, but essentially will be an indicator of the responsiveness of the particular AAA server to AAA requests. This number may be configured or hard coded, e.g., "do not send more than 50 transactions per second to AAA proxy No. 1". Alternatively, the number may be indicative of how many transactions per unit time the AAA proxy has recently been able to process. Similarly, the number may be a rate or count of transaction recently processed by the AAA proxy. In this manner it is now relatively straightforward to program the Wholesaler's AAA proxy service to load balance among the multiple instances of AAA services for $Corp_A$ given in the database. The AAA proxy service may also avoid sending AAA queries to AAA services whose status is set to "unavailable". This is shown in FIG. 5 with separate links -between the AAA proxy service at the Wholesaler's domain and the AAA services $AAA_1$, $AAA_2$ and $AAA_3$ at the $Corp_A$ domain.

For example, one way to implement this system is to provision $Corp_A$ with a number of AAA services for handling AAA requests. Each AAA service is capable of handling up to "X" query transactions per second. Hence, its available load factor per unit time is X. The AAA proxy service at the Wholesaler's domain can keep track of all queries it passes to these respective AAA services so that it can avoid generating more absolute queries than any particular AAA service can handle in a given amount of time. It can also load balance among multiple instances of the AAA services so that the load is shared more or less equally. This can be done in standard "round robin" fashion (e.g., $AAA_1$, $AAA_2$, $AAA_3$, $AAA_1$, etc.). It can also be done pseudo randomly or in any other practical manner. The selection manner and order is not important, the key is that now the load can be balanced and services that aren't able to process transactions can be avoided to speed overall throughput.

It is also possible to program the AAA services to return status information to the AAA proxy service at the Wholesaler's domain indicative of load and/or capacity. For example, the AAA service might be serving a number of inputs so that an originating AAA proxy service at a Wholesaler's domain might not otherwise know anything about its load. In that case, the AAA service can maintain and send periodically to the AAA proxy service a status report indicating load and capacity—e.g., "I can handle 300 transactions per second and I am currently handling 100 transactions per second." In this way an AAA service receiving queries from more than one Wholesaler can provide a Wholesaler with accurate current information regarding its load level and capacity.

Figure 6:
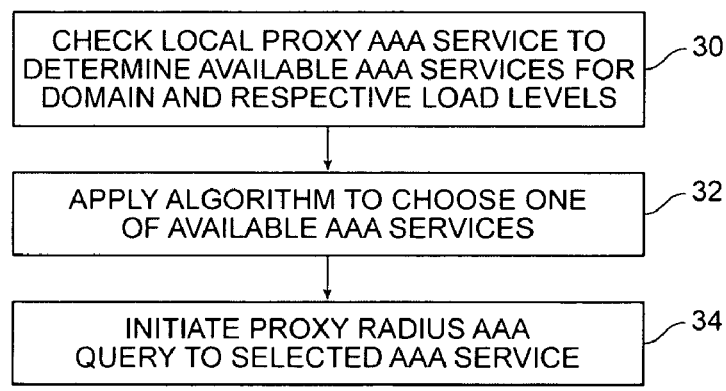
FIG. 6 is a flow diagram illustrating a process for accessing one of a plurality of remote AAA services at a domain in accordance with a presently preferred embodiment of the present invention.

FIG. 6 is a diagram showing the flow of a process which may be used to select one of a plurality of AAA services at the remote domain. At block 30 the local proxy AAA (26 in FIG. 5) and its associated database 28 are checked to determine the available AAA services at the remote domain and their respective load levels. For example, any AAA service that is "down," is not operational, or is operating over a certain percentage of its capacity could be considered "not available". One or more available AAA services may then be available at block 32. At block 32 an algorithm is applied to select among the available AAA services. If one is available, it is selected. If more than one AAA service is available at the remote domain, the algorithm may select one of the AAA services pseudo-randomly, or with a weighted random selection so that those with more available capacity are selected more often, or using a round robin approach, or with any other suitable selection algorithm as will now be apparent to those of ordinary skill in the art. Finally, at block 34 the AAA query is initiated from AAA proxy server 26 to the selected one of $AAA_1$, $AAA_2$, and $AAA_3$ as shown in the example of FIG. 5.

An AAA proxy server having the capabilities described above can be further used to allow the Wholesaler to behave in a fundamentally different manner than before. Now the Wholesaler can offer retail services to the user by buying and reselling wholesale services from any number of other providers.

For example, in the case of Joe@ISP.net who subscribed to VOIP at ISP.Net, the ISP can identify the user at the time he requests the VOIP service, look up the details of the SLA with that user, and determine which wholesale provider of telephony services such as PSTN (public switched telephone network services) can best service the call given the requirements of the SLA and the Wholesaler's desire to maximize its profits in reselling the service. A typical SLA with the user will specify a minimum bandwidth to provide the user during specified times if the day or week together with pricing information for the provision of such services.

Figure 7:
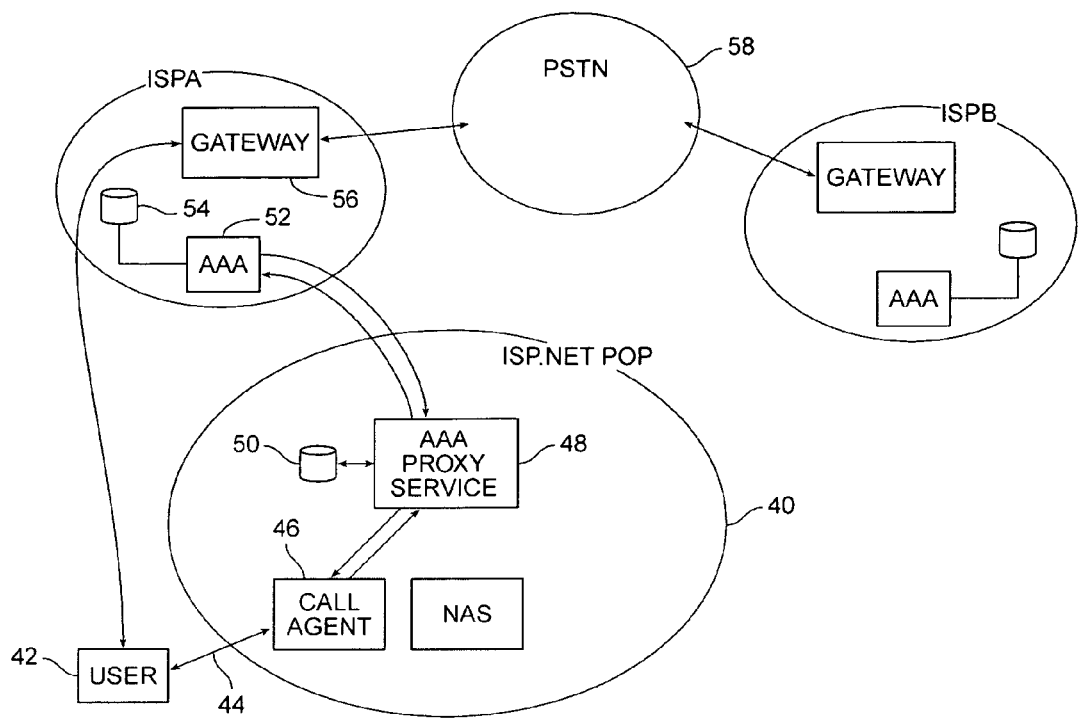
FIG. 7 is a diagram illustrating a system for accessing one of a plurality of remote sub-services in accordance with a presently preferred embodiment of the present invention.
Figure 8:
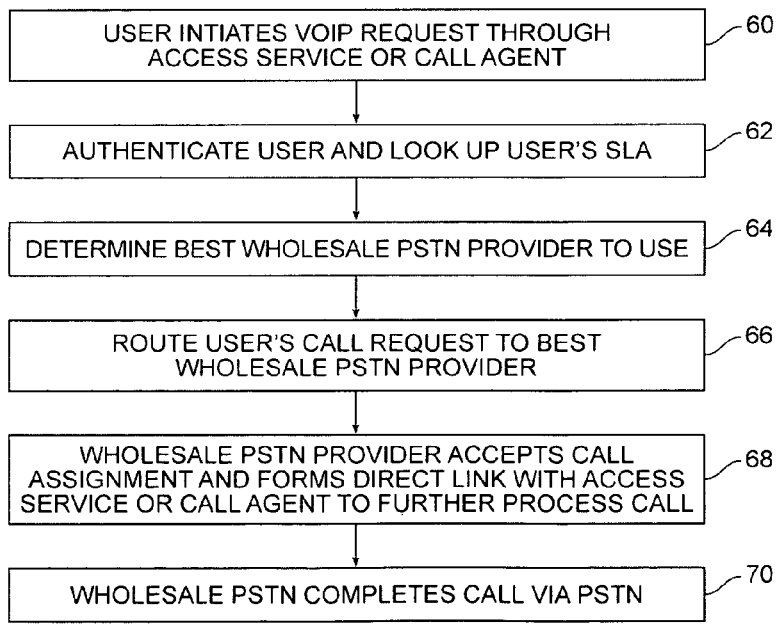
FIG. 8 is a flow diagram illustrating a process for accessing one of a plurality of remote sub-services in accordance with a presently preferred embodiment of the present invention.

An example of this mode of operation is given in FIGS. 7 and 8. In FIG. 7 the PoP (Point of Presence) 40 of the primary ISP (ISP.NET) is contacted by user 42 via a PPP connection 44 or another suitable connection. The call is directed to an H.323 gate keeper or SGCP (Simple Gateway Control Protocol) Call Agent 46 or equivalent intelligent network device as known to those of ordinary skill in the art (Block 60 in FIG. 8). Using the SGCP example,. the Call Agent 46 may seek to identify the user with the local AAA proxy server 48 (Block 62 in FIG. 8) when it receives a Notification from a residential gateway with the dialed digits. Instead of performing standard authentication, the AAA proxy server 48 can now perform a query to its local database 50 to determine the "best" Telephony provider (ISPA, ISPB) which fits the SLA between the user and the Wholesaler as well as the SLA between the Wholesaler and the Telephony provider (Block 64 in FIG. 8). Assuming that the SLA between ISP.NET and ISPA fits the parameters, AAA proxy service 48 sends an access-request to ISPA's AAA service 52 (which may be one of many as discussed above)(Block 66 in FIG. 8). The ISPA AAA service 52 consults its local database 54, determines its SLA parameters with ISP.NET, authenticates the request based upon ISP-.NET's device IP address (for example), and then notifies a PSTN gateway 56 (for example) and ISPA to create a link to the PSTN 58 and assign it a port (Block 68 in FIG. 8). One alternative implementation may be to create an RSVP reservation on the Telephony provider's data network to carry the voice. The AAA 52 then passes back the IP address of Gateway 56 and the port number assigned to the call in a RADIUS type access accent packet to AAA proxy service 48 which, in turn, notifies Call Agent 46 of the information in a RADIUS type access accept packet. Call Agent 46 then directs the PSTN Gateway to form a direct RTP (Real Time Protocol) stream with Gateway 56 (and vice-versa) and to communicate with the PSTN 58 in a conventional manner (Block 70 in FIG. 8). Signaling between the PSTN Gateway and the PSTN (typically ISUP or ISDN User Part) may be performed by the Call Agent or by other conventional means.

In another part of the present invention, the Wholesaler or its customer can determine that a user is a roaming user. This is done by comparing user profile information stored at the Wholesaler which indicates a user's "home" address with the DNIS ID information which indicates where the user is dialing into, and/or the CLID information which indicates where a user is calling from. Parsing a telephone number to determine the city/town location of the telephone number is well known in the art and is a function provided on many sites of the Internet. Where the user's "home" and calling location are different, one may conclude that the user is a roaming user such as a traveling businessman and may direct particular communications to that user such as targeted advertisements directed to businessmen. One example would be to target restaurant advertisements to the user for restaurants in the market he dialed into. These targeted advertisements would exploit the fact that the user is known to be away from home and the fact that the user is now near the restaurant. Similar arrangements could be made for other types of advertising and communications. For example, if the user subscribes to a weather service over the Internet, the weather service could determine the user's location by querying the ISP and return weather information relevant to the user's actual location.

Alternative Embodiments

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. An apparatus comprising:
a database interface for interfacing with a database; and
a protocol gateway coupled to said database, said protocol gateway configured to:
receive at a point of presence (PoP) in a first domain of a data communications network a network access request from a user, said network access request specifying a second domain which is not the same as said first domain;
forward the network access request to a proxy service at the PoP;
determine the user's domain;
look up information in said database regarding a plurality of authentication, authorization and accounting (AAA) services associated with the user's domain;
check the information to determine which of the plurality of AAA services associated with the user's domain are available;
select an available AAA service associated with the user's domain; and
proxy an access request to said selected AAA service.

2. The apparatus of claim 1 wherein said protocol gateway is further configured to load balance a plurality of network access requests to a user's domain among a plurality of said available AAA services associated with the user's domain.

3. The apparatus of claim 2 wherein said protocol gateway is further configured to load balance by assigning access requests to said plurality of AAA services associated with the user's domain in a round robin fashion.

4. The apparatus of claim 2 wherein said protocol gateway is further configured to load balance by assigning access requests to said plurality of AAA services associated with the user's domain in a pseudo-random fashion.

5. The apparatus of claim 2 wherein said protocol gateway is further configured to load balance by checking the information to determine a recent load factor for at least one of the plurality of AAA services associated with the user's domain, and wherein said protocol gateway is further configured to select an available AAA service associated with said user's domain by choosing an AAA service the load factor of which is below a threshold.

6. The apparatus of claim 5 wherein said protocol gateway is further configured to choose said AAA service by picking an AAA service having the least load factor of the plurality of available AAA services.

7. The apparatus of claim 1 wherein said protocol gateway is further configured to select an available AAA service associated with said user's domain by determining a value related to the load and capacity of each available AAA service.

8. The apparatus of claim 7 wherein said protocol gateway is further configured to select an available AAA service associated with said user's domain by choosing one of said available AAA services wherein said value is below a predetermined threshold.

9. The apparatus of claim 7 wherein said protocol gateway is further configured to select an available AAA service associated with said user's domain by choosing the one of said available AAA services having the least said value.

10. The apparatus of claim 1 wherein said protocol gateway is further configured to determine said user's domain by parsing a user's fully qualified domain name (FQDN).

11. The apparatus of claim 1 wherein said protocol gateway is further configured to determine said user's domain by checking said user's calling line identification (CLID) against a stored list of telephone numbers to determine a corresponding domain identification stored therewith.

12. The apparatus of claim 1 wherein said protocol gateway is further configured to determine said user's domain by checking an incoming digital number identification service identification (DNIS ID) against a stored list of telephone numbers to determine a corresponding domain identification stored therewith.

13. The apparatus of claim 1 wherein said protocol gateway comprises a software service configured to operate on a general purpose computer.

14. The apparatus of claim 13 wherein said protocol gateway comprises, a software service configured to operate on a general purpose computer running User Control Point (UCP) software.

15. An apparatus comprising:
a database interface for interfacing with a database; and a protocol gateway coupled to said database, said protocol gateway configured to:
  receive at a point of presence (PoP) of the data communications network a network access request to use a sub-service from a user;
  authenticate the user;
  look up in said database a service level agreement applicable to the user;
  look up in said database available sub-service-providers and corresponding service level agreements;
  determine the "best" sub-service provider to match with the user's request;
  request the sub-service provider to render the sub-service; and
  have the sub-service provider render the service.

16. The apparatus of claim 15 wherein said protocol gateway is further configured to:
  determine the "best" sub-service provider to match with said user's request by comparing the service level agreements of each available sub-service provider with the requested service and the user's service level agreement; and
  select a best sub-service provider on the basis of revenue maximization subject to the constraints imposed by the user's service level agreement.

17. The apparatus of claim 15 wherein said protocol gateway comprises a software service configured to operate on a general purpose computer.

18. The apparatus of claim 17 wherein said protocol gateway comprises a software service configured to operate on a general purpose computer running User Control Point (UCP) software.

19. An apparatus for managing sub-service network access requests to a data communications network, said apparatus comprising:
  means for receiving at a point of presence (PoP) of the data communications network a network access request to use the sub-service from a user;
  means for authenticating the user;
  means for looking up a service level agreement applicable to the user;
  means for looking up available sub-service-providers and corresponding service level agreements;
  means for determining the "best" sub-service provider to match with the user's request;
  means for requesting the sub-service provider to render the sub-service; and
  means for having the sub-service provider render the service.

20. The apparatus of claim 19 wherein said means for determining comprises means for comparing the service level agreements of each available sub-service provider with the requested service and the user's service level agreement and selecting a best sub-service provider on the basis of revenue maximization subject to the constraints imposed by the user's service level agreement.

21. Logic provided in software and encoded in one or more computer-readable media and when executed by a processor is operable to:
  receive at a point of presence (PoP) in a first domain of the data communications network a network access request from a user, said network access request specifying a second domain which is not the same as said first domain;
  forward the network access request to a proxy service at the PoP;
  determine the user's domain;
  look up information in a database regarding a plurality of authentication, authorization and accounting (AAA) services associated with the user's domain;
  check the information to determine which of the plurality of AAA services associated with the user's domain are available;
  select an available AAA service associated with the user's domain; and
  proxy an access request to said selected AAA service.

22. The computer-readable media of claim 21 wherein said software is further operable to, when executed, load balance a plurality of network access requests to a user's domain among a plurality of said available AAA services associated with the user's domain.

23. The computer-readable media of claim 22 wherein said software is further operable to, when executed, load balance by assigning access requests to said plurality of AAA services associated with the user's domain in a round robin fashion.

24. The computer-readable media of claim 22 wherein said software is further operable to, when executed, load balance by assigning access requests to said plurality of AAA services associated with the user's domain in a pseudo-random fashion.

25. The computer-readable media of claim 22 wherein said software is further operable to, when executed, load balance by checking the information to determine a recent load factor for at least one of the plurality of AAA services associated with the user's domain, and wherein said protocol gateway is further configured to select an available AAA service associated with said user's domain by choosing an AAA service the load factor of which is below a threshold.

26. The computer-readable media of claim 25 wherein said software is further operable to, when executed, choose said AAA service by picking an AAA service having the least load factor of the plurality of available AAA services.

27. The computer-readable media of claim 21 wherein said software is further operable to, when executed, select an available AAA service associated with said user's domain by determining a value related to the load and capacity of each available AAA service.

28. The computer-readable media of claim 27 wherein said software is further operable to, when executed, select an available AAA service associated with said user's domain by choosing one of said available AAA services wherein said value is below a predetermined threshold.

29. The computer-readable media of claim 27 wherein said software is further operable to, when executed, select an available AAA service associated with said user's domain by choosing the one of said available AAA services having the least said value.

30. The computer-readable media of claim 21 wherein said software is further operable to, when executed, determine said user's domain by parsing a user's fully qualified domain name (FQDN).

31. The computer-readable media of claim 21 wherein said software is further operable to, when executed, determine said user's domain by checking said user's calling line identification (CLID) against a stored list of telephone number to determine a corresponding domain identification stored therewith.

32. The computer-readable media of claim 21 wherein said software is further operable to, when executed, determine said user's domain by checking an incoming digital number identification service identification (DNIS ID) against a stored list of telephone numbers to determine a corresponding domain identification stored therewith.

33. Logic provided in software and encoded in one or more computer-readable media and when executed by a processor is operable to:

receive at a point of presence (PoP) of a data communications network a network access request to use a sub-service from a user;

authenticate the user;

look up in a database a service level agreement applicable to the user;

look up in said database available sub-service-providers and corresponding service level agreements;

determine the "best" sub-service provider to match with the user's request;

request the sub-service provider to render the sub-service; and have the sub-service provider render the service.

34. The computer-readable media of claim 33 wherein said software is further operable to, when executed:

determine the "best" sub-service provider to match with said user's request by comparing the service level agreements of each available sub-service provider with the requested service and the user's service level agreement; and select a best sub-service provider on the basis of revenue maximization subject to the constraints imposed by the user's service level agreement.

* * * * *

UNITED STATES PATENT AND TRADEMARK OFFICE
CERTIFICATE OF CORRECTION

PATENT NO. : 7,606,246 B2  Page 1 of 1
APPLICATION NO. : 11/402301
DATED : October 20, 2009
INVENTOR(S) : Sitaraman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Fifth Day of October, 2010

David J. Kappos
*Director of the United States Patent and Trademark Office*